(12) United States Patent
Sierson

(10) Patent No.: US 10,154,944 B2
(45) Date of Patent: Dec. 18, 2018

(54) KEEP IT KLEAN CARRY CASE

(71) Applicant: Sharon Sierson, Early, TX (US)

(72) Inventor: Sharon Sierson, Early, TX (US)

( * ) Notice: Subject to any disclaimer, the term of this patent is extended or adjusted under 35 U.S.C. 154(b) by 0 days.

(21) Appl. No.: 15/089,679

(22) Filed: Apr. 4, 2016

(65) Prior Publication Data

US 2017/0121057 A1    May 4, 2017

Related U.S. Application Data

(60) Provisional application No. 62/247,275, filed on Oct. 28, 2015.

(51) Int. Cl.

| | |
|---|---|
| B65D 21/02 | (2006.01) |
| A61J 17/00 | (2006.01) |
| A47K 10/32 | (2006.01) |
| B65D 25/10 | (2006.01) |
| B65D 25/04 | (2006.01) |
| B65D 43/16 | (2006.01) |
| B65D 43/22 | (2006.01) |

(52) U.S. Cl.
CPC ............... *A61J 17/00* (2013.01); *A47K 10/32* (2013.01); *A61J 17/001* (2015.05); *B65D 25/04* (2013.01); *B65D 25/10* (2013.01); *B65D 43/167* (2013.01); *B65D 43/22* (2013.01); *Y02W 30/807* (2015.05)

(58) Field of Classification Search
CPC .... B65D 21/0233; B65D 43/16; B65D 21/02; A47K 2010/3266; A47K 10/32; A61J 17/00; A61J 17/008
USPC ......... 206/223, 233; 220/522, 505, 504, 503
See application file for complete search history.

(56) References Cited

U.S. PATENT DOCUMENTS

| | | | | |
|---|---|---|---|---|
| 2,692,673 | A * | 10/1954 | Kruft | B65D 83/10 |
| | | | | 15/218 |
| 5,320,223 | A * | 6/1994 | Allen | B25H 3/06 |
| | | | | 206/372 |
| 5,638,957 | A * | 6/1997 | Brasier | A61F 13/551 |
| | | | | 206/581 |
| 6,164,442 | A * | 12/2000 | Stravitz | A45C 3/02 |
| | | | | 206/233 |
| 6,540,084 | B2 * | 4/2003 | Silvers | B65D 51/28 |
| | | | | 206/494 |
| 6,681,780 | B1 * | 1/2004 | Baxter | A45D 33/008 |
| | | | | 132/295 |
| 7,124,883 | B1 * | 10/2006 | Thomas | B65D 43/162 |
| | | | | 206/256 |
| 7,201,271 | B1 * | 4/2007 | Saad | A45C 11/00 |
| | | | | 132/315 |
| 7,434,410 | B2 * | 10/2008 | Ford | F25D 3/08 |
| | | | | 62/371 |
| 8,220,625 | B2 * | 7/2012 | Michaels | A45C 11/24 |
| | | | | 206/233 |
| 9,131,763 | B2 * | 9/2015 | Groberg | A45F 3/46 |

(Continued)

*Primary Examiner* — Steven A. Reynolds
(74) *Attorney, Agent, or Firm* — Frank Huy Pham; Pham IP Group

(57) ABSTRACT

A reusable multiple compartment carry case for baby care items. Upper storage compartment contains a pacifier, teether, and baby spoon in an effort to reduce exposure to germs to aid in hygienic practices. Lower storage compartment contains at least one baby care products. The present invention would be made of a dishwasher-safe, hard plastic material, and would contain customized cutouts in the top section to hold each item mentioned (teether, pacifier, and baby spoon).

4 Claims, 7 Drawing Sheets

(56) References Cited

U.S. PATENT DOCUMENTS

| | | | |
|---|---|---|---|
| 2006/0000739 A1* | 1/2006 | Kadish | B65D 83/0805 206/494 |
| 2007/0199841 A1* | 8/2007 | Mesalic | B65D 25/04 206/233 |
| 2008/0217192 A1* | 9/2008 | Hickey | B65D 43/16 206/233 |

* cited by examiner

KEEP IT KLEAN CARRY CASE

BACKGROUND OF THE INVENTION

1. Field of the Invention

The field of the invention is related to an apparatus for baby care item storage, in particular to a carry case having multiple compartments adaptable to different configurations and uses.

2. Description of the Prior Art

Baby care items that go directly into a child's mouth are plentiful. Every parent has several and stores them in a diaper bag, purse, car pocket, or some other less than sanitary place. In today's world, germs are rampant. Parents make every effort to shield their children and keep them healthy and usually appreciate helpful ideas. Existing frustrations with toting plastic bags were disorganized, wasteful, and cumbersome. Plastic tubs also have disadvantages as they are bulky and do not easily fit into a purse or diaper bag. Other prior arts are not customized for baby's teether or mouth items. They do not offer a separate compartment for wipes or any other product with which to clean baby's hands or the mouth items. They are not available in a variety of baby-friendly themes and designs to complement baby's existing paraphernalia.

Every mother of a child who uses a pacifier has at one time been faced with the dilemma of what to do when the child's pacifier has been dropped on the floor. Having to choose between giving the child the soiled pacifier back, put the pacifier in your own mouth to remove unknown contamination, or just let the child cry as you put it away until it could be cleaned did not allow for any happy answer.

Various prior arts have been provided for products available for cleaning pacifiers that consists of a pump spray bottle and a shield to hold the pacifer against. The pacifier is cleaned as it is sprayed. While the current technology is portable, it is not compact enough to be carried in the pocket of a diaper bag, purse, etc. Also, it would not be as convenient to have to remove the shield section, spray bottle, etc and begin the cleaning process in the middle of a depatment store, restaurant, etc as the child cries, as it would be to simply reach into the bag, open Binky Bath and hand child a clean pacifier, or insert the pacifier into Binky Bath and remove it, ready to give a clean pacifier back to the child in seconds.

A need exists in the art for a multiple storage compartment carry case which overcomes or at least mitigates at least one of the shortcomings outlined above or observed in the field.

SUMMARY OF THE INVENTION

A multiple compartment carry case is suitable for storing baby care items comprising an upper storage compartment suitable for storage of baby mouth items and a lower storage compartment suitable for storage of other baby sanitary related items.

In a preferred embodiment of the invention, the upper storage compartment opens on the other side of the case separately from the lower storage compartment to allow for quick and easy access of a stored baby mouth items, while the lower storage compartment opens on the other side of the case so that a user does not need to touch the baby mouth items stored on the upper storage compartment. This allows for access to the stored baby care items while keeping the baby mouth items intact and sanitary in a closed position.

In a further embodiment of the multiple compartment carry case, the upper storage compartment is defined by a lower section and a pivotally connected lid. The lid is pivotally connected to the lower section at a back side of the lid and the lower section so that the upper storage compartment opens towards the back side of the lower section.

In a further embodiment of the multiple compartment carry case, the upper storage compartment comprises of a plurality of cut-outs for storing baby mouth items.

In a further embodiment of the multiple compartment carry case, the lower storage compartment is defined by a lower section and a pivotally connected lid. The lid is pivotally connected to the lower section at a back side of the lid and the lower section so that the lower storage compartment opens towards the back side of the lower section.

In a further embodiment of the multiple compartment carry case, the lower storage compartment is subdivided into a plurality of container bodies for storing baby sanitary related items.

In a further embodiment of the multiple compartment carry case, a top container body is partially nested within a lower container body and pivotally connected to the lower container body.

In a further embodiment of the multiple compartment carry case, the baby sanitary related items include baby care products in the form of a plurality of diapers and a plurality of wipes.

In a further embodiment of the multiple compartment carry case, the case further comprises latches between the lids and the lower sections for locking the case when the lids are in the closed position.

DETAILED DESCRIPTION OF THE INVENTION

Figure 1:
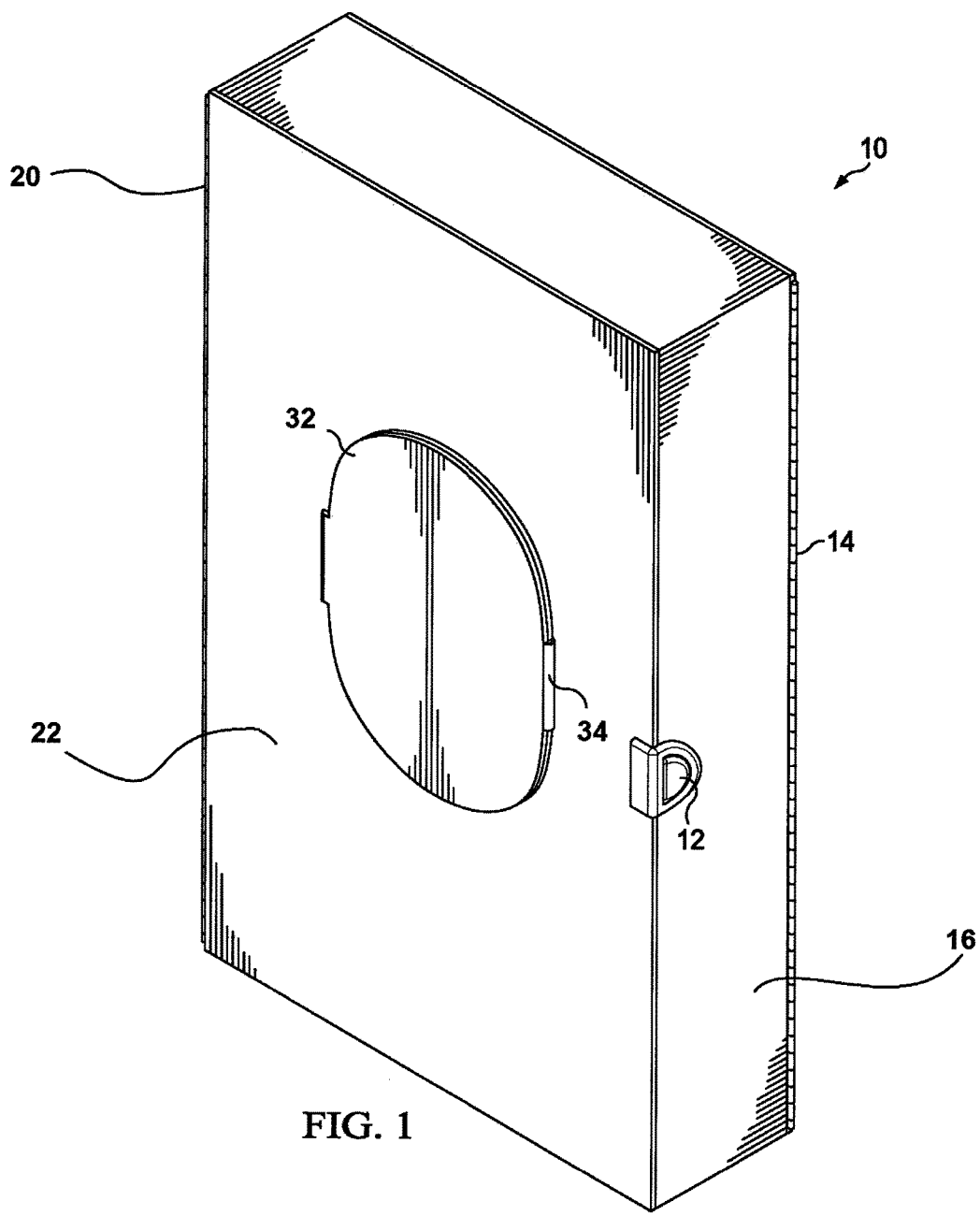
FIG. 1 is a right view of the present invention.
Figure 2:
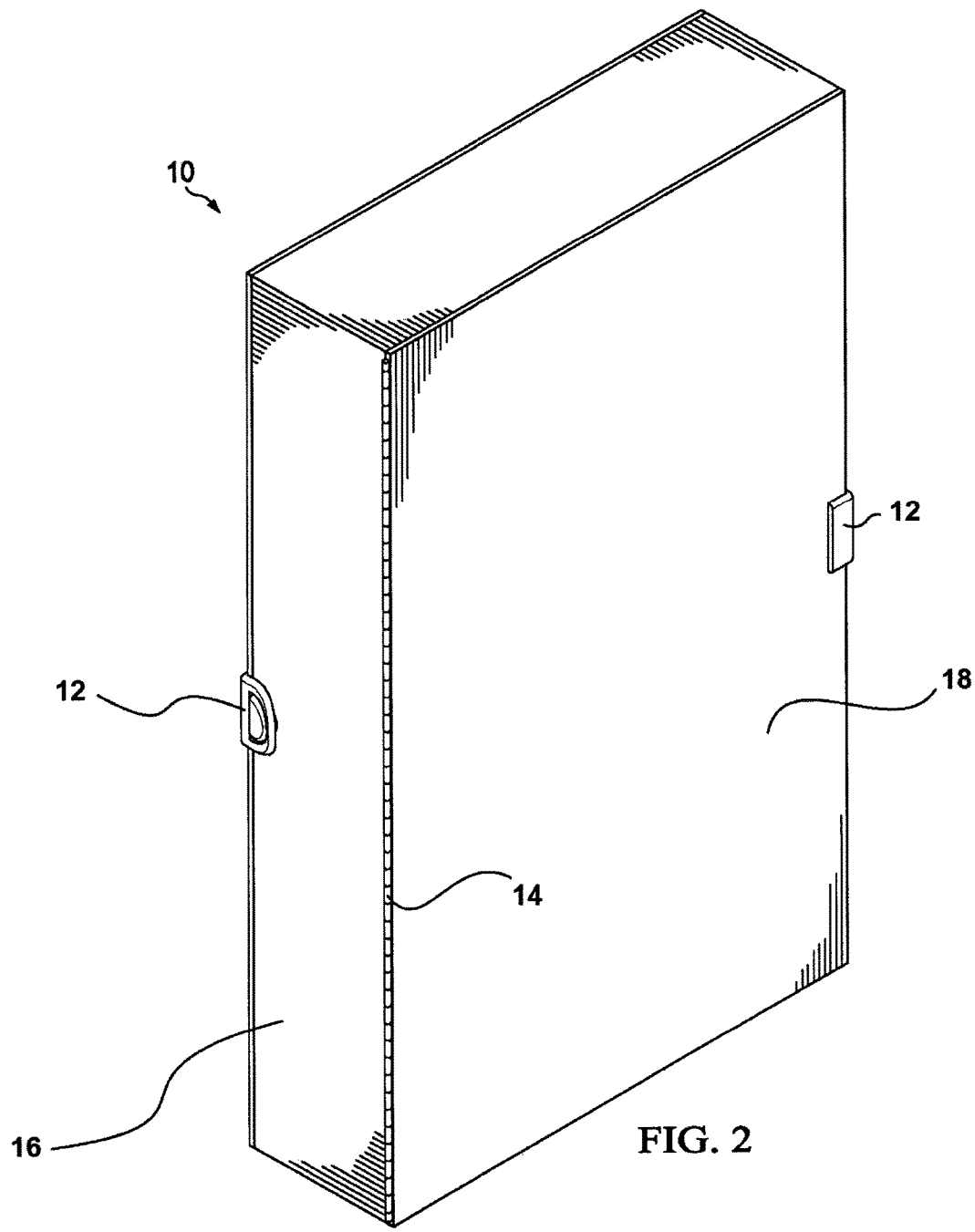
FIG. 2 is a left view of the present invention.
Figure 3:
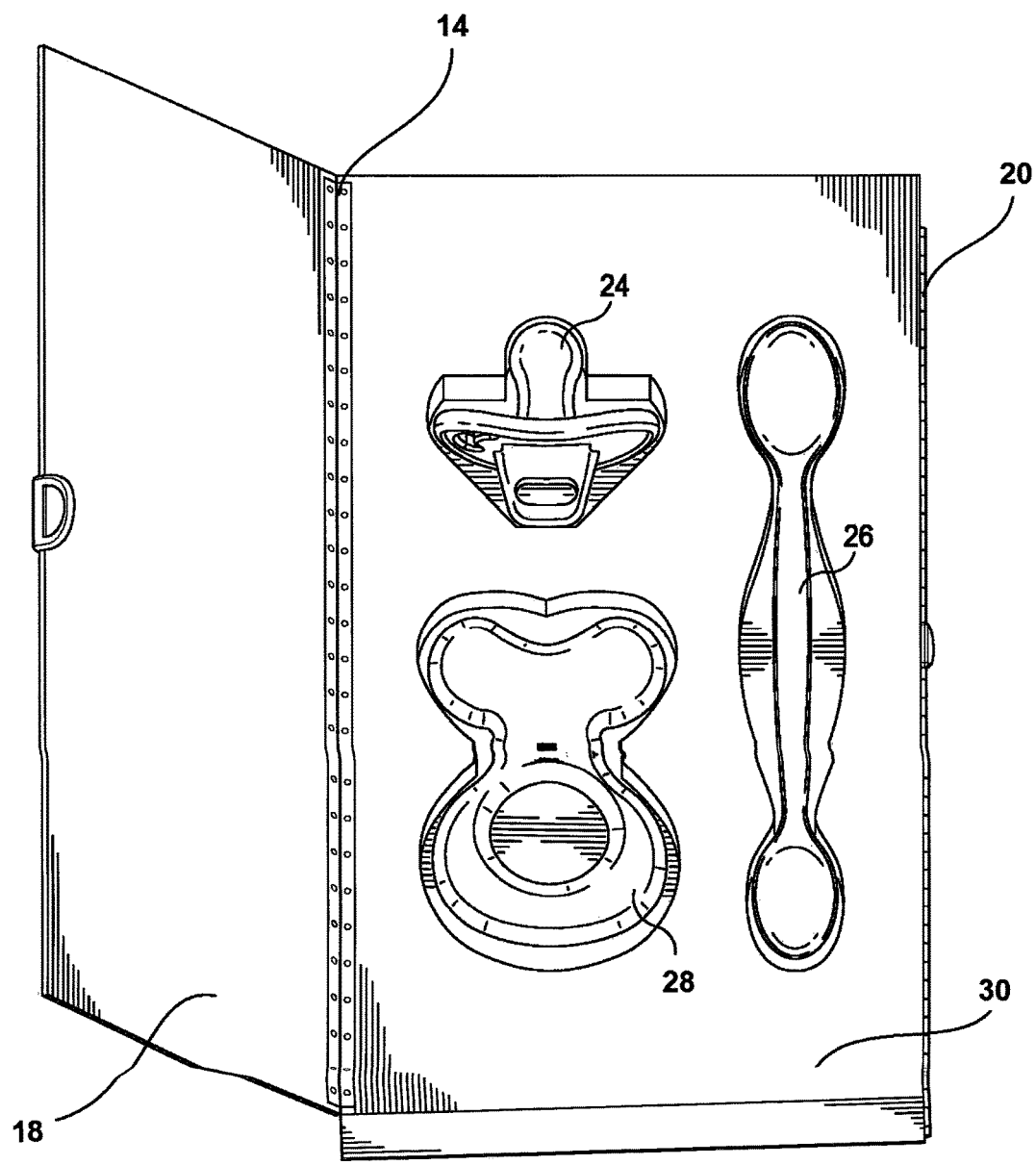
FIG. 3 is an inside top view of the present invention.
Figure 4:
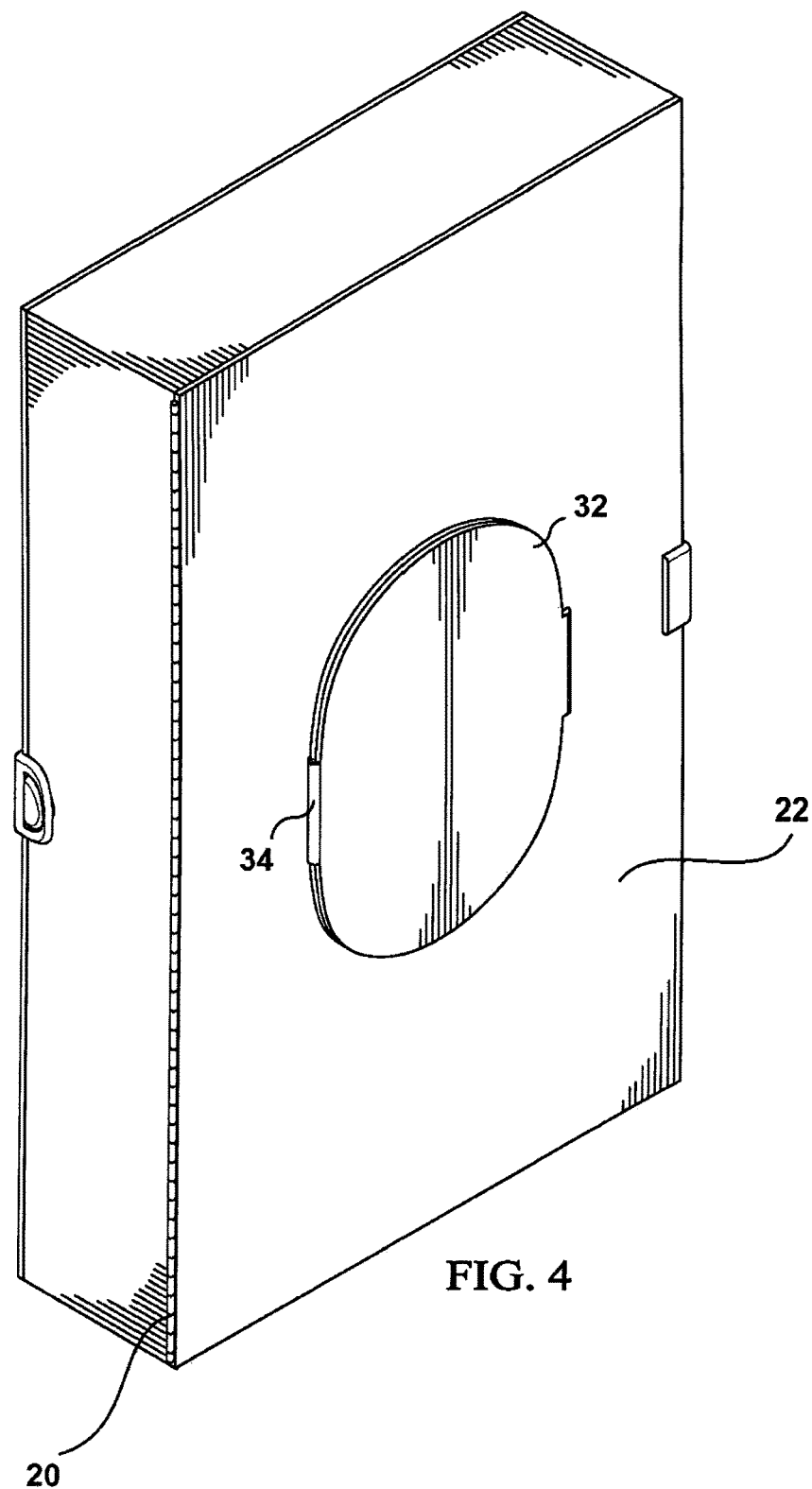
FIG. 4 is a bottom view of the present invention.

An embodiment of a multiple compartment storage carry case 10 according to the present invention is illustrated in FIGS. 1-7. Referring to FIGS. 1, 2, and 3, the multiple compartment storage carry case 10 has an upper storage compartment 30 having a front side 16 pivotally connected to a lower storage compartment lid 22 using a hinged connection 14. The hinge 14 may be located at the opposite side of the construction from the hinge 20, so that the upper storage compartment lid 18 opens in the direction opposite from the opening direction of the lower storage compartment lid 22 (as shown in FIGS. 2-3).

Still referring to FIGS. 1-2, the upper storage compartment lid 18 may be secured in a closed position using a latch 12, such as for example, draw latch. It will be appreciated that any suitable means of securing or locking the lid 18 in the closed position may be implemented.

FIG. 3 illustrates the multiple storage compartment carry case 10 in use as a storage medium for the components of baby mouth items. In a non-limiting embodiment, the upper storage compartment 30 is provided with a plurality of cut-outs 24, 26, and 28 in which baby mouth items may be stored.

Although FIG. 3 illustrates a particular arrangement for the components of the baby mouth items, those skilled in the art will appreciate that the arrangement is not critical, and can be varied without departing from the spirit and scope of the present invention. For example, the arrangement depends in part on the configuration of the components of the storage carry case 10, since different configurations of the components may be used in the storage carry case 10, thereby requiring a different arrangement.

Figure 5:
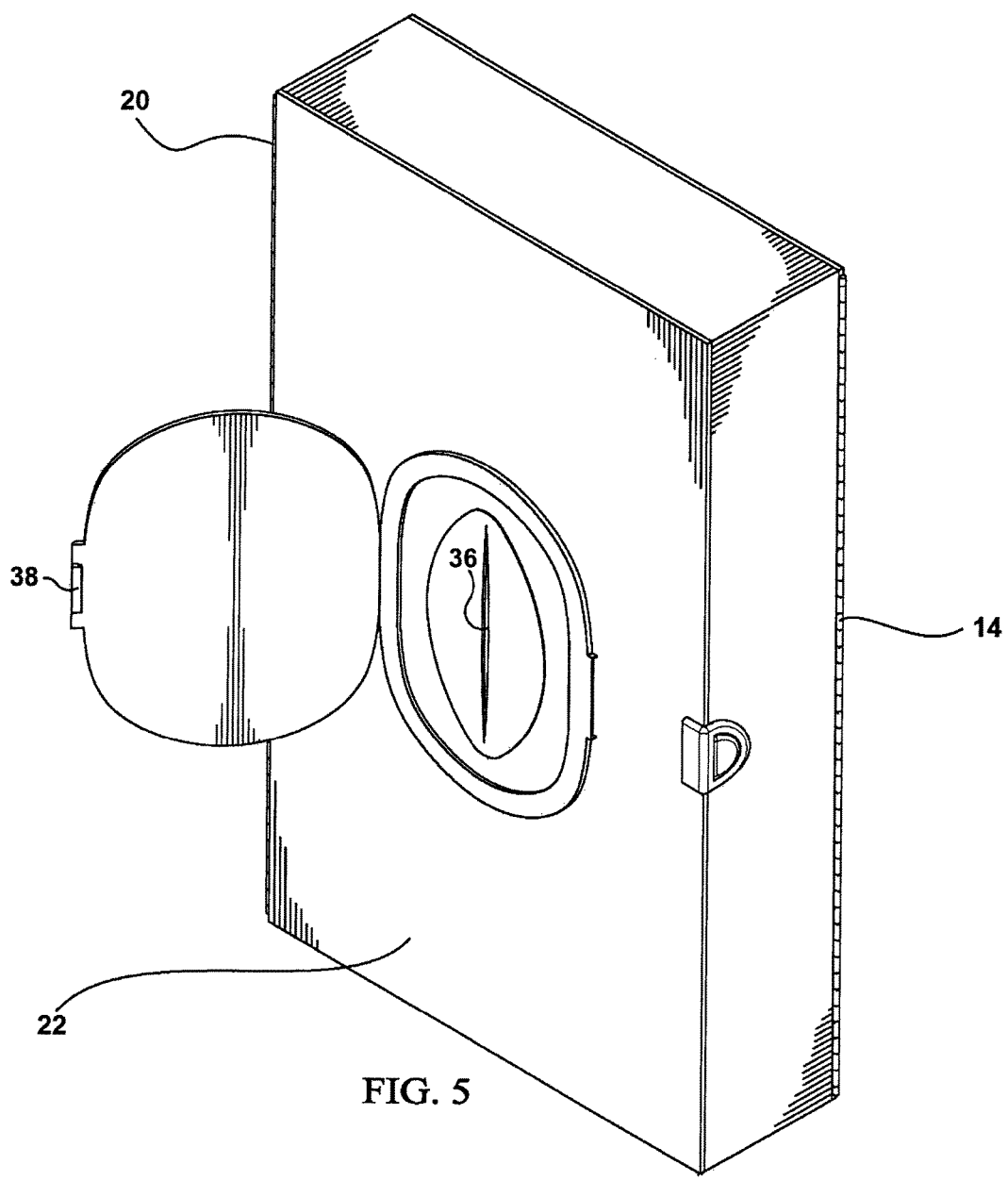
FIG. 5 is an outside bottom view with lid covering open of the present invention.
Figure 6:
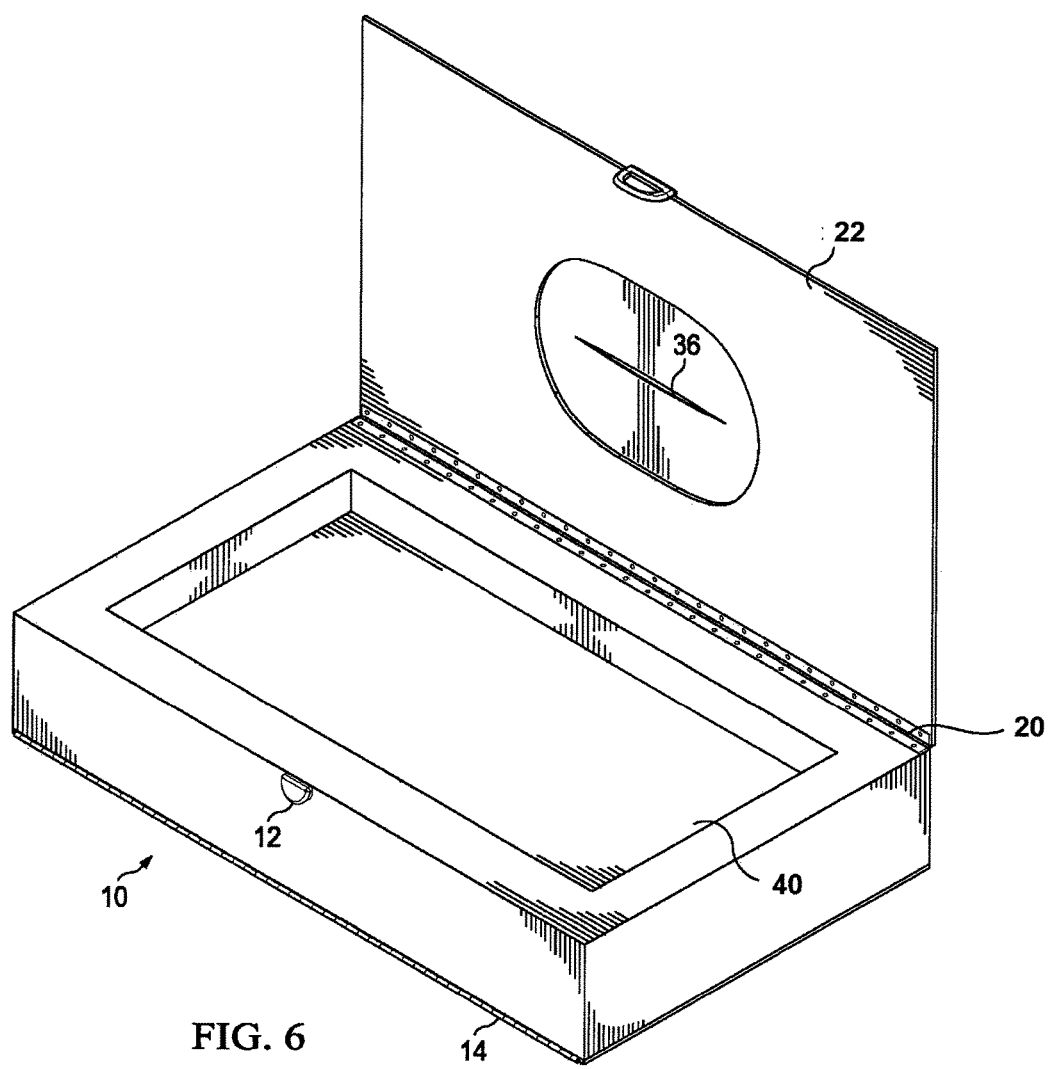
FIG. 6 is an inside bottom view showing the top container body of the present invention.
Figure 7:
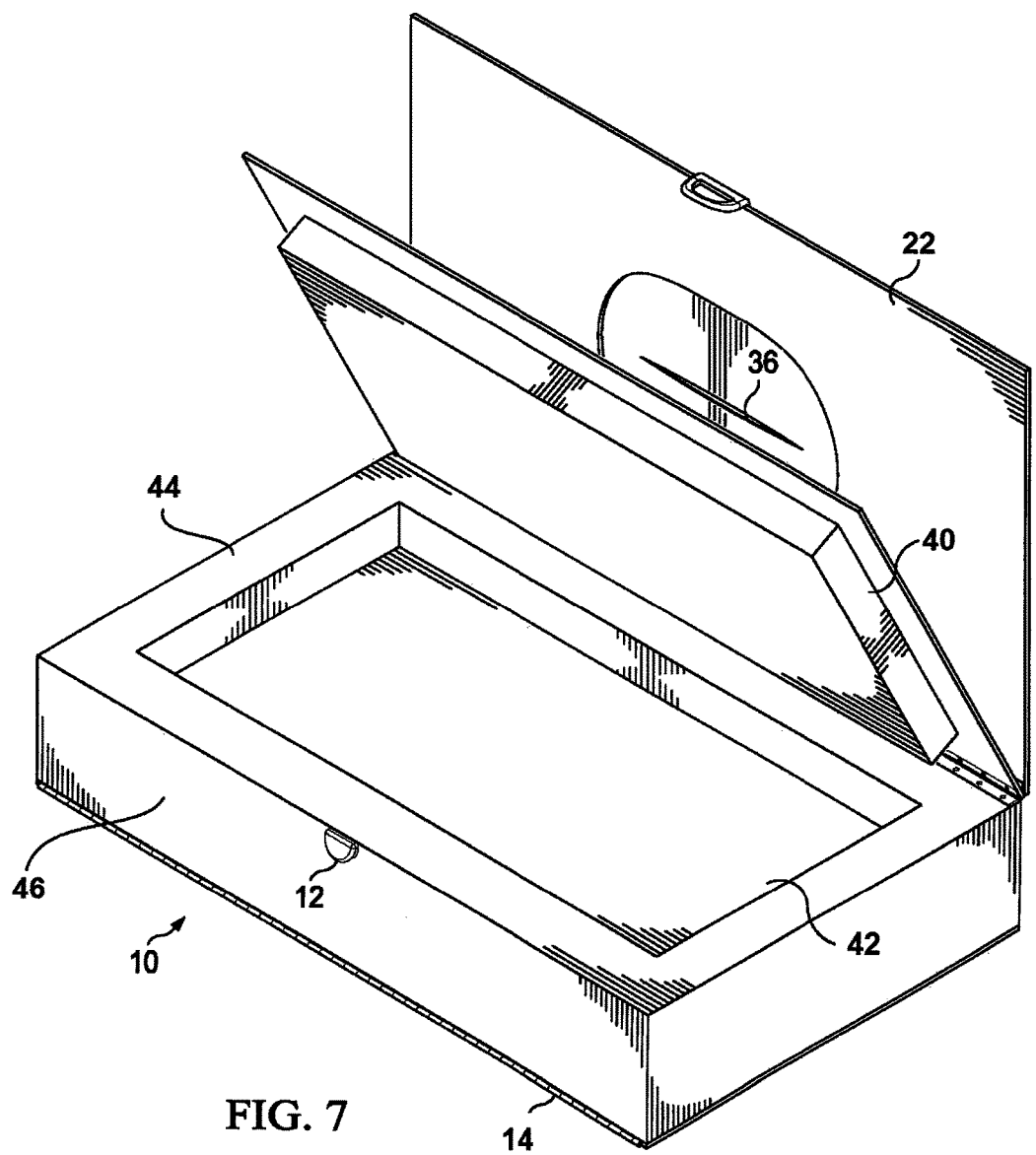
FIG. 7 is an inside bottom view showing the two container bodies of the present invention.

Referring to FIGS. 4, 5, 6 and 7, the multiple compartment storage carry case 10 has a lower storage compartment 44 having a front side 46 pivotally connected to the upper storage compartment lid 18 using a hinged connection 20. The hinge 20 may be located at the opposite side of the construction from the hinge 14, so that the lower storage compartment lid 22 opens in the direction opposite from the opening direction of the upper storage compartment lid 18 (as shown in FIGS. 6-7).

The lower storage compartment lid 22 may be secured in a closed position on a top of the container body 40 using latch 12, such as for example, draw latch. It will be appreciated that any suitable means of securing or locking the lid 22 in the closed position may be implemented.

Referring FIGS. 5-6, the lower storage compartment lid 22 has a top portion 42 covering an aperture 36 which is used to provide access to a first container body 40. A top cover 32 which is connected to a top portion 42 using a hinge connection 34 and is secured to a locked position using a snap 38. To open the top cover 32 for accessing the first container body 40, user simply lifts the top cover 32 from the snap 38.

FIG. 7 shows the lower storage compartment 44 of the multiple storage compartment carry case 10 having the first container body 40, which is pivotally connected to a second container body 42 using a hinge connection 20. The first container body 40 may be positioned above the second container body 42 in the space defined by the second container body 42.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

Having illustrated and described the principles of the present invention in a preferred embodiment, it will be apparent to those skilled in the art that the embodiment can be modified in arrangement and detail without departing from such principles. Any and all such embodiments are intended to be included within the scope of the following claims.

What is claimed is:

1. A multiple compartment carry case for baby care items, comprising:
    an upper storage compartment having an upper container body for storing baby mouth items;
    a lower storage compartment having a first container body and a second container body wherein said first container body is pivotally connected to said second container body via a hinge and wherein said first container body is partially nested within said second container body; and
    a lower storage compartment lid configured to pivotally connect to said lower storage compartment and to open towards a back side of said lower storage compartment; and
    an upper storage compartment lid configured to pivotally connect to said upper storage compartment, and wherein said lower storage compartment lid has a top portion and a top cover to releasably cover an aperture for accessing and dispensing baby care items from said first container body.

2. The multiple compartment carry case of claim 1, wherein said upper storage compartment lid opens in opposite direction from the lower storage compartment lid.

3. The baby care item of claim 1 is a plurality of wipes enclosed in the first container body.

4. The multiple compartment carry case of claim 1, wherein the upper storage compartment is a lockable compartment and the lower storage compartment is a lockable compartment.

* * * * *